(12) United States Patent
Prough

(10) Patent No.: US 6,616,384 B2
(45) Date of Patent: Sep. 9, 2003

(54) HIGH PRESSURE FEEDER HAVING SMOOTH POCKET IN ROTOR

(75) Inventor: J. Robert Prough, Saratoga Springs, NY (US)

(73) Assignee: Andritz, Inc., Glens Falls, NY (US)

(*) Notice: Subject to any disclaimer, the term of this patent is extended or adjusted under 35 U.S.C. 154(b) by 0 days.

(21) Appl. No.: 10/194,239

(22) Filed: Jul. 15, 2002

(65) Prior Publication Data

US 2002/0176752 A1 Nov. 28, 2002

Related U.S. Application Data

(62) Division of application No. 09/569,042, filed on May 10, 2000, now Pat. No. 6,468,006.
(60) Provisional application No. 60/133,669, filed on May 11, 1999.

(51) Int. Cl.[7] ............................................. B65G 53/08
(52) U.S. Cl. ......................................... 406/63; 406/181
(58) Field of Search ............................... 406/52, 63, 64, 406/181, 183

(56) References Cited

U.S. PATENT DOCUMENTS

| | | |
|---|---|---|
| 2,459,180 A | 1/1949 | Richter |
| 2,688,416 A | 9/1954 | Skretting |
| 2,870,009 A | 1/1959 | Richter |
| 2,901,149 A | 8/1959 | Richter |
| 2,914,223 A | 11/1959 | Richter |
| 3,041,232 A | 6/1962 | Richter et al. |
| 3,982,789 A | 9/1976 | Funk |
| 4,017,270 A | 4/1977 | Funk et al. |
| 4,033,811 A | 7/1977 | Gloersen |
| 4,187,043 A | 2/1980 | Kindersley |
| 4,338,049 A | 7/1982 | Richter et al. |
| 4,415,296 A | 11/1983 | Funk |
| 4,430,029 A | 2/1984 | Richter et al. |
| 4,508,473 A | 4/1985 | Richter et al. |
| 4,516,887 A | 5/1985 | Richter et al. |
| 5,236,285 A | 8/1993 | Prough |
| 5,236,286 A | 8/1993 | Prough |
| 5,443,162 A | 8/1995 | Sherman |
| 5,476,572 A | 12/1995 | Prough |
| 5,622,598 A | 4/1997 | Prough |
| 5,635,025 A | 6/1997 | Bilodeau |
| 5,736,006 A | 4/1998 | Prough |
| 5,753,075 A | 5/1998 | Stromberg et al. |
| 5,766,418 A | 6/1998 | Prough |
| 5,795,438 A | 8/1998 | Stromberg et al. |

OTHER PUBLICATIONS

Richter, "The History of Kamyr Continuous Cooking", 1981.

*Primary Examiner*—Joseph A. Dillon
(74) *Attorney, Agent, or Firm*—Nixon & Vanderhye, P.C.

(57) ABSTRACT

A high pressure transfer device has a rotor mounted in a housing for rotation with respect to inlet and outlet ports and having through going pockets. The pockets have interior surface configurations substantially devoid of nooks, crannies, and related flow restrictions. This can be accomplished by providing inserts in the pockets, or by constructing the pockets so that there are substantially smooth interior wall tubes extending from one end of the rotor and the other and cooperating with an inlet and an outlet at the same time. Using the high pressure transfer device to feed wood chips or the like in a slurry using a high pressure transfer pump can result in flow through the rotor pockets that is more uniform by at least 5% compared to in conventional high pressure transfer devices.

17 Claims, 11 Drawing Sheets

HIGH PRESSURE FEEDER HAVING SMOOTH POCKET IN ROTOR

CROSS REFERENCE TO RELATED APPLICATION

This application is a divisional of and claims priority to application Ser. No. 09/569,042 filed May 10, 2000, now U.S. Pat. No. 6,468,006 and claims the benefit of provisional application serial No. 60/133,669 filed May 11, 1999, the disclosures of both of which applications are incorporated by reference herein.

BACKGROUND AND SUMMARY OF THE INVENTION

In the processing of comminuted cellulosic fibrous material, for example, wood chips, to produce cellulose pulp, one of the somewhat essential devices used to introduce a pressurized slurry of material to a treatment vessel is what is known in the art as the High Pressure Feeder ("HPF"). The HPF is a rotary valve-type device that, with the aid of a high-pressure pump, transfers a slurry of material and liquid at one pressure for example, between about 0 to 2 bar gauge, to a second higher pressure, for example, between about 5–15 bar gauge, at which treatment of the material is most desired. One advantageous function of this device is the capability to act as an pressure isolation device. Should a disruption in the operation of the digester or the feed system occur, the HPF prevents the high-pressure medium from escaping to the low-pressure medium or to the surrounding environment.

Since the early development of the continuous cooking process by the late Johan Richter and others (as documented in Mr. Richter's *The History of Continuous Cooking* [1981]), the HPF has been an essential feature of the feed system of the continuous digester. In this 1981 publication Mr. Richter documented the early development of the HPF, in particular some early designs are shown in FIGS. 17, 18, 21, and 22 of this publication. Rydholm also documents one early "balanced rotor" HPF design in FIG. 1.1 of the 1970 publication *Continuous Pulping Processes*. The development of HPF design is also documented in U.S. Pat. Nos. 2,459,180; 2,688,416; 2,870,009; 2,901,149; 2,914,223; 3,041,232; 4,033,811; 4,338,049; 4,430,029; 4,508,473; and 4,516,887. Not until the recent development of the slurry-type pumping of the material by Prough, et al., as described in U.S. Pat. Nos. 5,476,572; 5,622,598; 5,635,025; 5,736,006; 5,753,075; 5,766,418; and 5,795,438 and marketed under the name LO-LEVEL® Feed System by Ahlstrom Machinery Inc. of Glens Falls, N.Y., has the elimination of the HPF and pumping directly to the treatment vessel been technically feasible.

However, the present design of the HPF, as exemplified by the designs shown in U.S. Pat. Nos. 5,236,285 and 5,236,286, has not progressed significantly since the earlier designs developed by Richter, et al. The recent development of digester feed system technology, as exemplified by the work performed in the development of the LO-LEVEL® Feed System, and documented in U.S. Pat. No. 5,476,572 and the other patents listed above, has resulted in new insights into the limitations of existing HPF designs and how these limitations can be overcome by improving the HPF as a result of these insights. The present invention is an example of such an improvement.

As shown in FIGS. 3, 4 and 5 of U.S. Pat. No. 5,236,285, the HPF comprises or consists of a stationary housing with a pocketed cylindrical rotor mounted for rotation in the housing. The housing includes four ports: a high-pressure inlet port; a high-pressure outlet port; a low-pressure inlet port and a low-pressure outlet port. The low-pressure inlet is opposite the low-pressure outlet and the high-pressure inlet is opposite the high-pressure outlet. As the pocketed rotor (driven by a variable speed motor and gear reducer) rotates in the housing, the through-going pockets of the rotor sequentially communicate with the four ports of the housing. Typically, the rotor contains two or more through-going pockets such that different pockets communicate with different high and low-pressure ports as the rotor rotates. The unique, hydraulically-balanced design of the HPF permits the rotor pockets to be exposed to high and low pressure fluids simultaneously without causing a load imbalance and excessive wear of the rotor or its lining.

Typically, the top port of the feeder housing of the HPF is the low-pressure inlet port into which a slurry of chips and liquid is introduced to the feeder. This historically has been true for over thirty years since the slurry of chips and liquor have been introduced to the HPF by gravity from a conduit, known in the art as the Chip Chute, mounted above the HPF. However, due to the pump-feeding which characterizes the LO-LEVEL Feed System marketed by Ahlstrom Machinery Inc., the pressurized slurry flow from the slurry pump may be introduced to a low-pressure inlet of the HPF which is oriented wherever necessitated by the installation. The pump-fed slurry can be introduced to a port located physically on top, on either side, on the bottom of the HPF, or even to a port oriented at an oblique angle, that is, at any angle of orientation desired. However, for the sake of illustration, the low-pressure inlet of the HPF of the present invention will be assumed to be located on top of the feeder, for example, as shown in FIGS. 3–5 of U.S. Pat. No. 5,236,285. The rotor typically rotates at a speed of between about 5 to 15 rpm, preferably, between about 7 to 10 rpm, depending upon the capacity of the HPF and the production rate of the pulping system it is used to feed.

As the low-pressure slurry is introduced to the low-pressure inlet of the HPF, one or more of the through-going pockets of the rotating rotor receive the slurry. As noted above, the low-pressure outlet of the HPF is located opposite the low-pressure inlet. Therefore, as the slurry is introduced to the low-pressure inlet and the first end of one of the through-going pockets, the slurry flows into the pocket and toward the second end of the pocket, in this case, toward the lower end of the pocket, and toward the low-pressure outlet. The low-pressure outlet port of the HPF is typically provided with a screen element, for example, a cast horizontal bar type screen element (see for example the screen element 29 in U.S. Pat. No. 5,443,162). This screen element retains the chips in the slurry within the feeder and allows some of the liquid in the slurry to pass out of the second end of the pocket and through the screen. This liquid typically is recirculated back to a location upstream of the HPF. The chips that are introduced to the rotor pocket, including those chips retained by the screen element, are transported by the rotation of the rotor. After a typical one-quarter revolution of the rotor, the first end of the pocket that was once in communication with the low-pressure inlet is placed in communication with the high pressure outlet. The high-pressure outlet typically communicates with the inlet of a digester, either a continuous or batch digester, via one or more conduits. At the same time, the rotation of the rotor also places the second end of the through-going pocket, which was just in communication with the low-pressure outlet, in communication with the high-pressure inlet. The high pressure inlet typically receives a flow of high-pressure liquid from a high-pressure hydraulic pump. The pressure of this liquid typically ranges from about 5 to 15 bar gauge, and is typically about 7–10 bar gauge. This high-pressure liquid displaces the slurry of chips and liquid from the through-going pocket and out of the high-pressure outlet and ultimately to the inlet of the digester.

As the rotor continues to rotate, the second end of the pocket which received the high-pressure fluid then is placed in communication with the low-pressure inlet and receives another supply of slurry from the conduit connected to the low-pressure inlet. Similarly, the first end of the pocket is rotated into communication with the low-pressure outlet of the housing, having the screen element. The process described above then repeats itself such that during one complete revolution of the rotor each through-going pocket receives and discharges two charges of chips and liquid. The rotor typically contains at least two, typically four, through-going pockets such that the rotor is repeatedly receiving slurry from the low-pressure inlet and discharging slurry out the high-pressure outlet. The ends of the these pockets act as both an inlet for slurry and an outlet depending upon the orientation of the rotor.

Over the years, certain modifications have been made to the rotor or housing in order to improve the operation or efficiency of the HPF. As shown in U.S. Pat. No. 5,236,285 one such modification was made to the screen element in the low-pressure outlet in which the leading edge of the screen was blanked off. As the rotor rotates, this blanking of the screen postpones the exposure of the pocket to the suction pressure of the pump typically attached to the low-pressure outlet of the feeder. This prevents the screen from being blinded over with small wood chips, that is, fines and pins, prior to exposing the pocket to the full suction of the pump below. U.S. Pat. No. 5,236,285 also discloses a modification of the high-pressure inlet which minimizes the compression of the chips in the pocket due to the high-pressure introduced to the pocket by the high-pressure inlet. In a fashion similar to the screen modification discussed above, this modification to the leading edge of the high-pressure inlet comprises or consists of a barrier, or "pre-pressurization wedge" [See item 46 of FIG. 5 of U.S. '285.], which prevents the pocket from being exposed to high-pressure liquid, which can compress the chips, prior to the pocket communicating with the high-pressure outlet. As a result, the uncompressed chip slurry is more easily discharged from the pocket and out the high-pressure outlet.

U.S. Pat. No. 5,236,286 discloses a method of improving the filling efficiency of a HPF by exposing the two sets of rotor pockets with an isolated supply of suction at the low-pressure outlet. The pump suction at the low-pressure outlet is simply isolated into two separate conduits.

U.S. Pat. No. 5,443,162 discloses a method of increasing the efficiency of the HPF by increasing the spacing between horizontal bars in the screen element while stiffening the screen assembly by placing a reinforcing bar at the mid-span of the bars. The increased bar spacing provides for more open flow area and thus less undesirable pressure drop across the screen element.

The present invention provides further improvements to the efficiency and operation of the HPF.

During development and evaluation of the LO-LEVEL Feed System, it was discovered that the discharge of slurry from the pockets of the HPF is hampered by the geometry of the pockets. Since the rotor is exposed to both high and low pressure liquids simultaneously, in conventional HPFs the potential of producing a load imbalance on the rotor, which might precipitate accelerated wear, is minimized by using a unique overlapping pocket geometry. As a result, each pocket is not uniform in dimension but necks-down to a minimum dimension or "throat area" as the pocket passes through the rotor. This throat area defines the minimum flow area of each pocket. However, there are regions within and outside the throat area where the area of flow is restricted due to the geometry of the pocket. These restrictions or "nooks and crannies" in the flow area of the pocket limit, if not restrict, the flow through the pocket. It is possible that such narrow pocket dimensions form areas where the flow of slurry stagnates and interferes with the evacuation of slurry from the pocket when the pocket is exposed to the high-pressure liquid introduced at the high-pressure inlet.

One aspect of the present invention overcomes this resistance to evacuating the pocket by providing a means for delaying the exposure of the pocket to the high-pressure liquid so that when the pocket is exposed to the high-pressure liquid an increased flow velocity through the pocket is obtained. This increased flow velocity, over a typically shorter period of time, aids in propelling the slurry out of the pocket, including out of the areas where the flow is restricted, so that the pocket is more thoroughly and completely emptied. For example, calculations indicate that without any form of restriction in the high pressure inlet, the inlet of the pocket would be exposed to the flow of high-pressure liquid for about 1.0 secs. Under current practice, using the present height of the pre-pressurization wedge this exposure time is reduced to about 0.9 secs. However, using the present invention, the exposure time is further reduced to about 0.8 secs. That is, the essentially same volume of flow is passed through the pocket volume in less time such that the rate of flow is greater. This greater flow rate can aid in the removal of slurry from the pocket, especially from the restricted flow areas of the pocket.

One form of the means for delaying the exposure of the pocket to high pressure liquid, and thus of achieving the desired increased flow velocity according to the invention, is to reduce the size of the opening in the high-pressure inlet so that it is smaller than conventional, for, example at least about 10%, preferably at least about 20%, and even as much as at least about 50% smaller, than the conventional high-pressure inlet opening. This reduction in area may be achieved, in one example, by increasing the size of the "pre-pressurization wedge" disclosed in U.S. Pat. No. '285. For example, where the wedge used in conventional HPFs may be about 4.5 inches in height above the inside surface of the high-pressure outlet, so that the open area of the outlet is about 30% less than the largest cross-section of the outlet, for the present invention, the wedge height is one that preferably results in a reduction in outlet area of at least about 40% less, more preferably at least about 50% less than the largest open area of the outlet. For example, compared to conventional "pre-pressurization wedges", a wedge used according to the present invention is preferably about 2 inches taller and reduces the open area of outlet by at least about 40% compared to the largest area of the outlet. Other structures besides wedges can be used, however; any conventional structure that can achieve this goal being suitable.

The invention can be effected by casting the desired structure into the high-pressure inlet of a newly designed HPF, or existing HPFs may be modified by welding steel blocks into the inlet and machining the blocks to the desired dimensions. These blocks or pre-machined wedges may also be attached by any other conventional connecting device, for example, by a bolted connection.

In another and likely most significant embodiment of the present invention, the restriction in flow through the pocket is minimized by eliminating the nooks and crannies in the pocket geometry to provide a more uniform flow area. This can either be achieved by modifying an existing pocket geometry, for example, by "filling in" the areas of the pocket that restrict flow or by fabricating new rotors having though-going pockets having more uniform geometry, that is, a geometry that is substantially devoid of the flow restrictions that are characteristic of the prior art HPF rotors. This may even be achieved by fabricating HPF rotors using cylindrical or polygonal pipe or tubing so that the pocket geometry becomes essentially uniform in cross section from one end of the pocket to the other. Such a fabrication has the further advantage of providing smoother flow surfaces, along the inside of the pipes or tubes, than are presently available in the present cast rotor design.

According to one aspect of the present invention there is provided a high pressure transfer device comprising: A housing. A pocketed rotor containing a plurality of through going pockets, the rotor rotatable about a given axis of rotation and the pockets having opposite end openings which function as both inlets and outlets depending upon the angular position of the rotor and the pockets are provided in at least first and second sets. A housing enclosing the rotor, the housing having an exterior periphery and first through fourth ports disposed around the exterior periphery thereof for registry with the inlets to and outlets from the through going pockets, for each set; for each set the first port being opposite the third port; and the second port opposite the fourth port. The rotor mounted in the housing for rotation with respect to the ports about the given axis of rotation. And, the pockets having an interior surface configuration substantially devoid of nooks, crannies, and related flow restrictions.

The interior surface configuration of the pockets may be defined by substantially smooth interior wall tubes. For example the tubes may be substantially polygonal in cross-section over at least a majority of the length thereof, but also may be circular or elliptical. Also at least some of the tubes may be mounted in a substantially cruciform position within the rotor.

Alternatively the interior surface configuration comprises inserts substantially filling pre-existing nooks, crannies, and related flow restriction. The inserts may be substantially solid metal, may be initially fluid but hardenable wear resistant material such as epoxy or cement, and/or may be hollow or partially hollow metal inserts.

The first port may comprise a high pressure inlet port, and the device may further comprise a high pressure inlet port configuration having an opening adjacent the rotor at least 40% less in cross-sectional area than the largest cross-sectional area of the high pressure inlet.

According to another aspect of the present invention there is provided: a high pressure transfer device comprising: A housing. A pocketed rotor containing a plurality of through going pockets, the rotor rotatable about a given axis of rotation and the pockets having opposite end openings which function as both inlets and outlets depending upon the angular position of the rotor and the pockets are provided in at least first and second sets (preferably with the pockets in each set offset from the pockets in the at least one other set). A housing enclosing the rotor, the housing having an exterior periphery and first through fourth ports disposed around the exterior periphery thereof for registry with the inlets to and outlets from the through going pockets, for each set; for each set the first port being opposite the third port; and the second port opposite the fourth port. The rotor mounted in the housing for rotation with respect to the ports about the given axis of rotation. And, the pockets defined by substantially smooth interior wall tubes.

According to yet another aspect of the present invention there is provided a high pressure transfer device comprising: A housing. A pocketed rotor containing a plurality of through going pockets, the rotor rotatable about a given axis of rotation and the pockets having opposite end openings which function as both inlets and outlets depending upon the angular position of the rotor and the pockets are provided in at least first and second sets (preferably with the pockets in each set offset from the pockets in the at least one other set). A housing enclosing the rotor, the housing having an exterior periphery and first through fourth ports disposed around the exterior periphery thereof for registry with the inlets to and outlets from the through going pockets, for each set; for each set the first port being opposite the third port; and the second port opposite the fourth port. The rotor mounted in the housing for rotation with respect to the ports about the given axis of rotation. And, the pockets filled at side portions thereof with flow precluding inserts.

According to yet another aspect of the present invention there is provided a method of enhancing the flow transfer characteristics of a high pressure transfer device comprising: A high pressure transfer device comprising: a housing; pocketed rotor containing a plurality of through going pockets, the rotor rotatable about a given axis of rotation and the pockets having opposite end openings which function as both inlets and outlets depending upon the angular position of the rotor and the pockets are provided in at least first and second sets; a housing enclosing the rotor, the housing having an exterior periphery and first through fourth ports disposed around the exterior periphery thereof for registry with the inlets to and outlets from the through going pockets, for each set; for each set the first port being opposite the third port; and the second port opposite the fourth port; the rotor mounted in the housing for rotation with respect to the ports about the given axis of rotation; the method comprising: (a) Substantially filling the nooks, crannies, and related flow restrictions in the pockets to provide a more uniform flow area through the pockets. And, (b) rotating the rotor about its axis while causing a low pressure slurry to flow from the second port through the rotor pockets to the fourth port, and causing a high pressure liquid to flow from the first port through the rotor pockets to the third port.

In the method (a) and (b) may be practiced so that the flow in (b) is more uniform by at least 5% (e.g. more than 10%, or even more than 15%) than if (a) were not practiced. In the practice of the method (a) may be practiced filling the nooks, crannies, and related flow restrictions with a substantially solid metal, or with an initially fluid but hardenable wear resistant material, or with an at least partially hollow insert.

According to yet another aspect of the present invention there is provided a method of constructing and operating a high pressure transfer device comprising a housing having opposite first and third ports, and opposite second and fourth ports and a rotor mounted for rotation within the housing, the method comprising: (a) Providing at least two tubes defining substantially smooth interior wall through extending pockets in the rotor. And, (b) rotating the rotor about its axis while causing a low pressure slurry to flow from the second port through the rotor pockets to the fourth port, and causing a high pressure liquid to flow from the first port through the rotor pockets to the third port.

In the practice of the method described above, (a) may be accomplished by mounting at least two tubes in a substantially cruciform position in the rotor. Further (a) may be practiced using substantially polygon cross-section tubes, or circular or elliptical cross-section tubes.

It is the primary object of the present invention to provide for enhanced operation and flow of a high pressure transfer device. This and other objects of the invention will become clear from an inspection of the detailed description of the invention and from the appended claims.

DETAILED DESCRIPTION OF THE DRAWINGS

Figure 1:
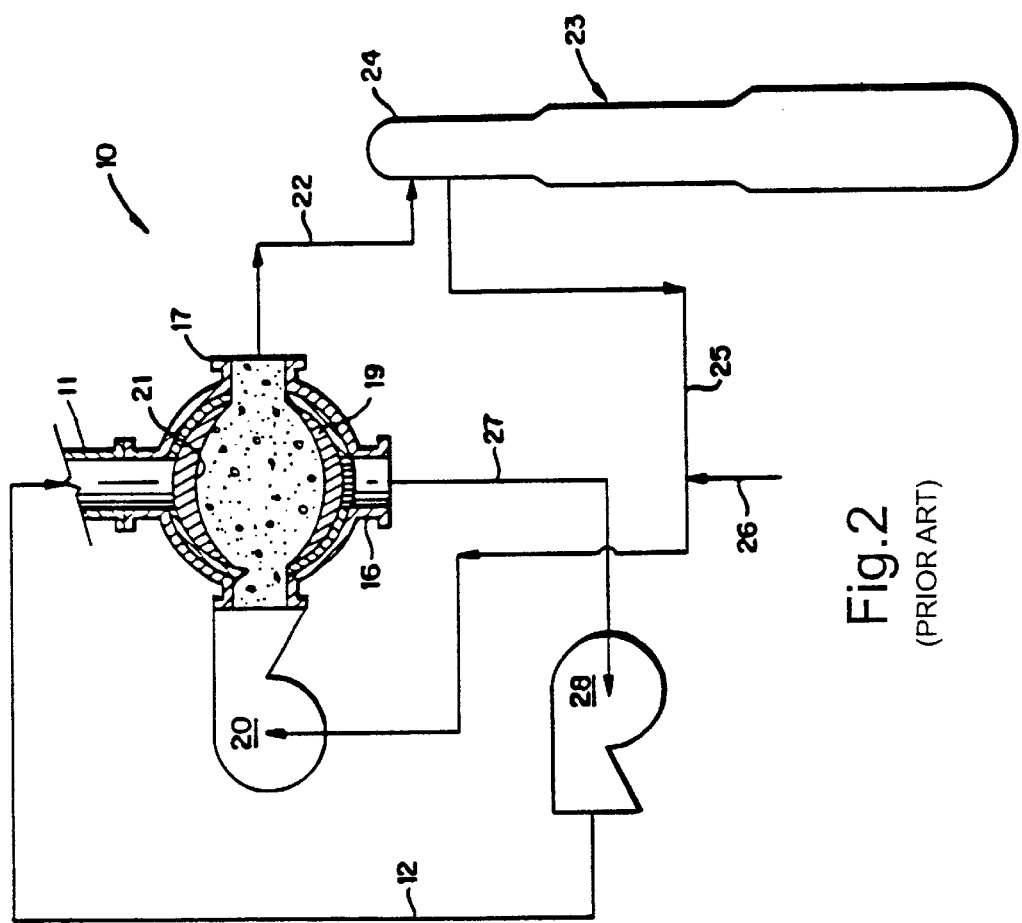
FIG. 1 schematically illustrates the ideal filling of a HPF pocket in by the prior art.
Figure 2:
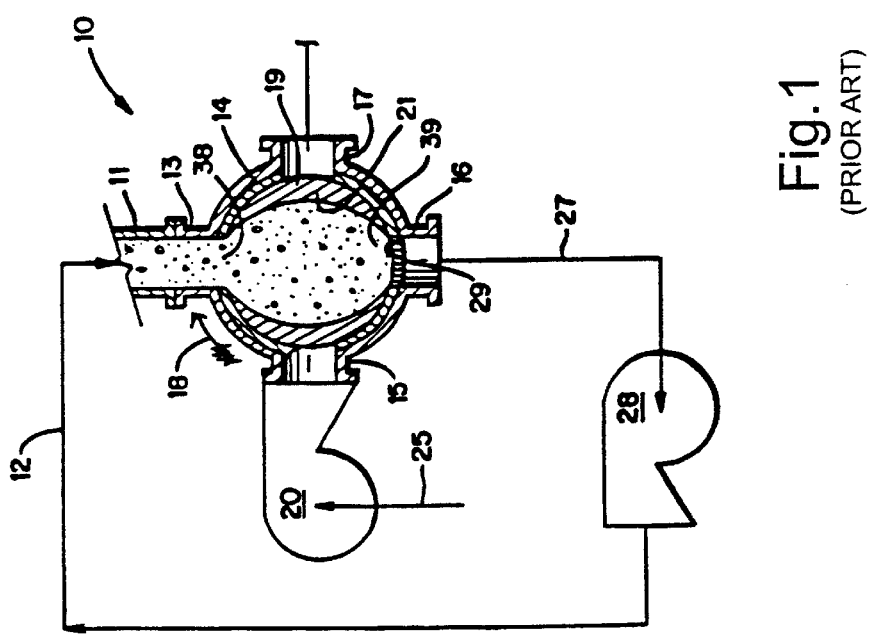
FIG. 2 is a view like FIG. 1 only showing the ideal emptying of a HPF pocket, and illustrating the HPF connected to the top of a continuous digester.

FIGS. 1 through 4 illustrate the structure and operation of a conventional HPF, as sold by Ahlstrom Machinery Inc., as defined by the prior art. FIGS. 1 and 2 schematically illustrate the operation of a high pressure transfer device, shown generally by reference numeral 10, according to the prior art. As is conventional, the low pressure inlet port 13 of device 10 is connected to a Chip Chute or Chip Tube 11, which is supplied with steamed chips from a conventional steaming vessel, for example, from a horizontal screw-type steaming vessel or from a Diamondback® steaming vessel, marketed by Ahlstrom Machinery Inc, of Glens Falls, N.Y. If a Diamondback® or similar type vessel is used a slurry of chips and liquor may be transferred and pressurized by a slurry-type pump, for example, a Wemco® screw-type slurry pump or a Lawrence slurry pump. The chips are typically slurried by a source of liquid, for example, from line 12. The chute or tube 11 is connected to the low-pressure inlet port 13 of a metal housing 14. The housing 14 also has a high-pressure inlet port 15, a low-pressure outlet port 16, and a high-pressure outlet port 17, disposed at approximately 90° intervals in the direction of rotation 18 (the direction of rotation is not particularly important and could either be in the direction 18, or opposite thereto) of a pocketed, tapered, metal rotor 19 disposed within the housing 14. The rotor 19 has first and second sets of through extending pockets (see FIG. 4), and the housing has a port (or port segment) associated with each set.

Connected to the high-pressure inlet port 15 is a device for supplying high pressure liquid, typically the conventional high pressure pump 20. As illustrated in FIG. 2, the pump 20 provides liquid under high pressure so that when the port 15 is in communication with a pocket 21 within the rotor 19 the chips or like cellulosic fibrous material within the pocket 21 are flushed out the high-pressure outlet port 17 into conduit 22, for example, the conduit known in the art as the "top circulation line", associated with a conventional continuous digester 23, though the digester may also be a batch digester. The line 22 feeds the slurry of chips and liquid under pressure to the top 24 of the digester 23. At the top 24 a conventional solids/liquid separator, for example, a device known in the art as a "top separator" or an "inverted top separator" (not shown) is provided. This separator returns some of the liquid slurrying the chips in the line 22, via the conduit 25, which is ultimately connected to the inlet of the pump 20. The liquid in lines 22, 25 typically is a combination of cooking liquor, for example, kraft white liquor, wood moisture, steam condensate, and sometimes black liquor, and which may be supplemented from the make up line 26. For non-kraft situations, the liquid in lines 22, 25 could be water, sulfite cooking liquor, or solvent pulping liquid, among others.

Connected to the low pressure outlet port 16, and providing a suction thereto, is a line 27 connected to a low pressure pump 28, the pump 28 in turn being connected to the line 12 to supply slurrying liquid to the chip chute 11. If the device 10 is fed by a slurry-type pump as described above, the pump 28 is no longer necessary since the slurry is sufficiently pressurized by the slurry pump.

Mounted within the housing 14 at the low pressure outlet port 16 is a screen, typically, one of the two screens shown generally by reference numeral 29. As seen in FIG. 1, the screens 29 allow liquid to pass into the conduit 27 under the influence of the suction of pump 28, or the pressure of an upstream slurry pump, while the chips or like cellulosic fibrous material cannot pass through the screen 29 and, therefore, remain in pocket 21 in rotor 19.

Figure 4:
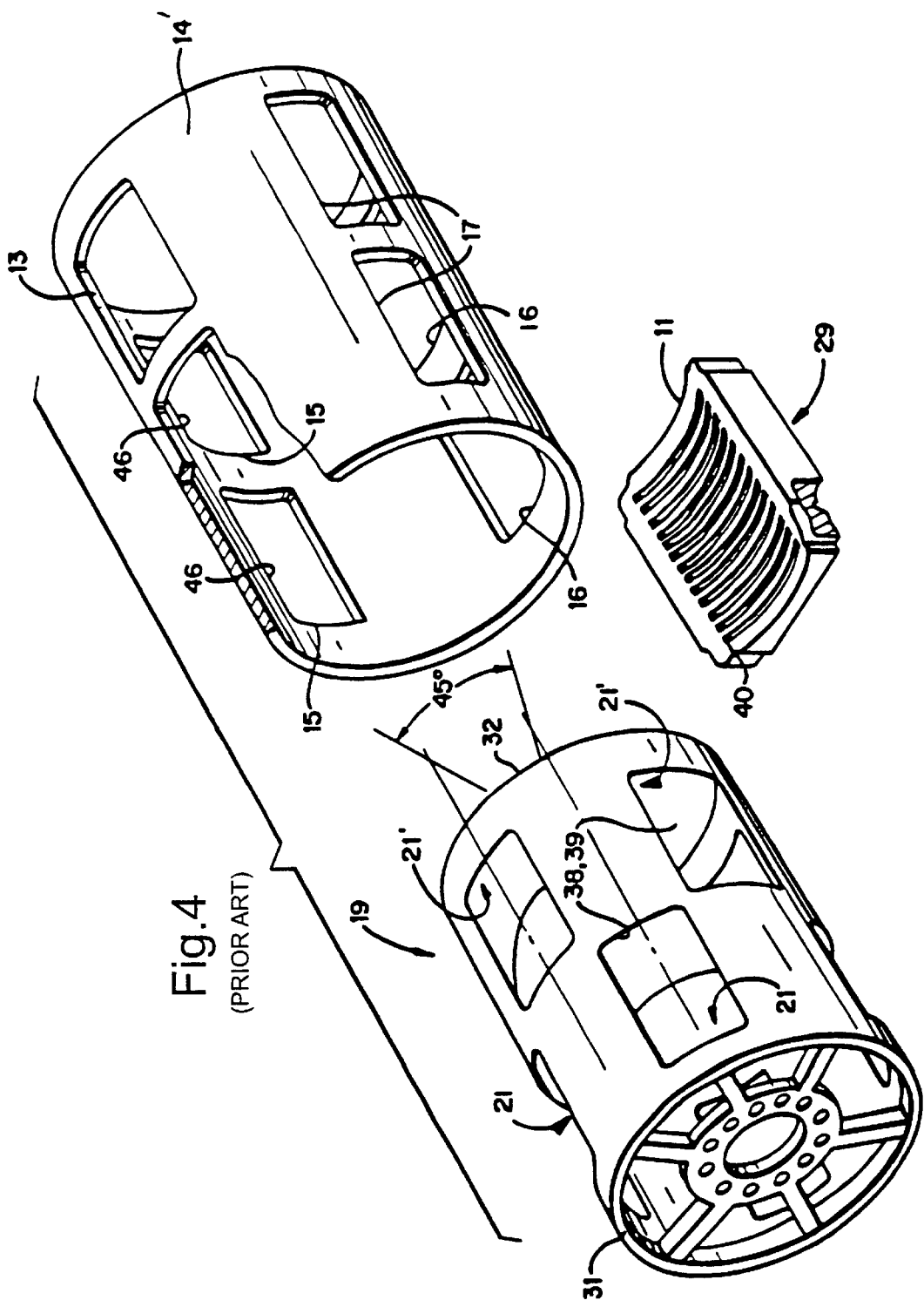
FIG. 4 is an exploded perspective view illustrating certain parts of the HPF shown in FIG. 3.

FIG. 4 illustrates the rotor 19, which is tapered from a first end 31 thereof to the second end 32; a housing liner 14', mounted within housing 14; and one of at least two screens 29. The rotor 31 includes a plurality of (e.g., four) diametrically through-going pockets 21, 21'. Typically two pockets 21 are disposed in a first set, and two pockets 21' in a second set, the sets spaced along the axis of rotation, and the pockets of one set are offset with respect to the pockets of the other. The liner 14' includes assorted openings 46 which communicate with rotor pockets 20, 21', and housing ports 13, 15, 16 and 17.

Figure 3:
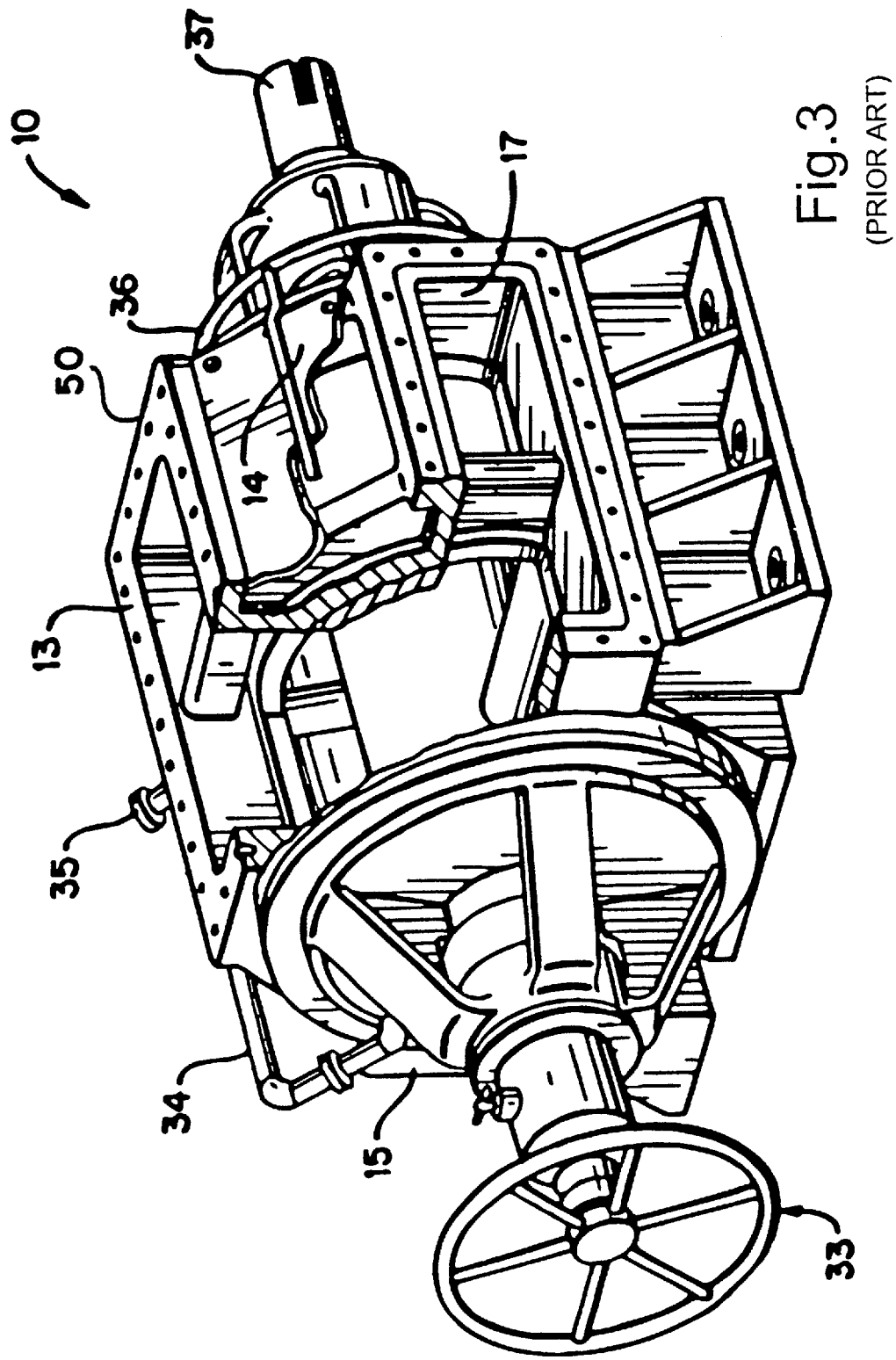
FIG. 3 is a perspective view of the HPF of FIGS. 1 and 2.

As shown in FIG. 3, a plug clearance adjustment mechanism 33 can be provided for adjusting the tapered rotor 19 within the housing liner 14' which is mounted within a housing 50, and the housing 50 may be provided with a plurality of other conventional components such as a bell housing equalization line 34, a white liquor purge connection 35, a preheat header 36, and a shaft 37—connected to a power source for rotating the rotor 19 and to the rotor itself.

Figure 5:
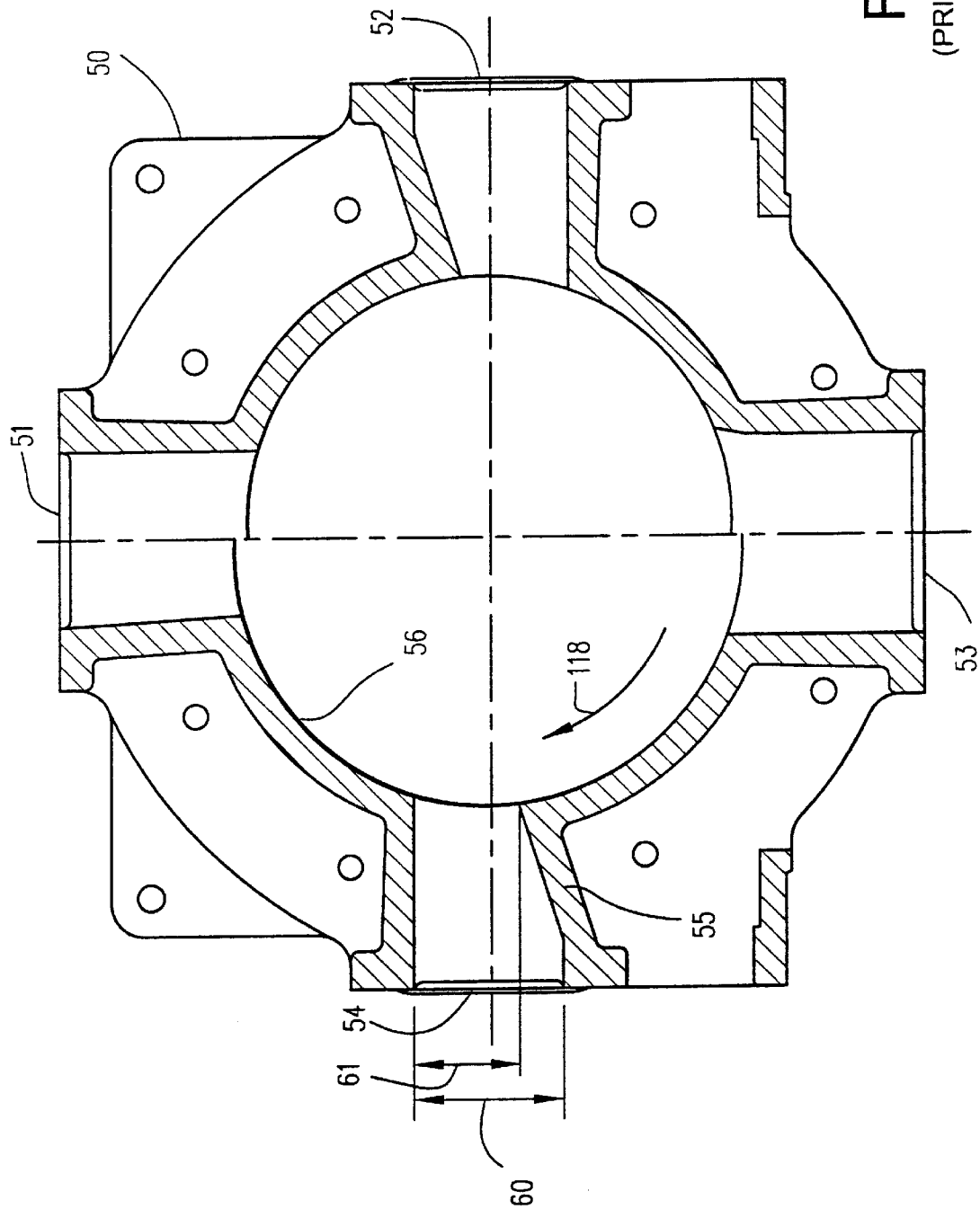
FIG. 5 is an end view, partly in cross section and partly in elevation, of an exemplary HPF according to the prior art.

FIG. 5 is a cross section of the housing 50 shown in FIG. 3 as viewed from the end of the housing having the handwheel 33. FIG. 5 illustrates the relative location of the low-pressure inlet 51, low-pressure outlet 53, high-pressure inlet 54 and high-pressure outlet 52 of housing 50. The rotor (not shown, see item 19 in FIG. 4) rotates in the housing in the direction of arrow 118. Note that the inside surface 56 of housing 50 is shown as a broken line to represent the tapered geometry of this internal surface—inside surface 56 of the housing and the outside surface of the rotor 19 (FIG. 4) are tapered so that the rotor position can be axially adjusted to optimize the clearance between the housing liner and the rotor.

FIG. 5 illustrates the location of the "pre-pressurization wedge" 55 in the high-pressure inlet 54 according to the prior art. This wedge effectively reduces the height of the inlet from height 60 to height 61. This wedge delays the exposure of the rotor pocket (see FIG. 4), which approaches inlet 54 in the direction of arrow 118, so that the compression of the chips in the pocket is minimized before exposing the chips to the full pump pressure provided by pump 20 (see FIG. 1).

Figure 6:
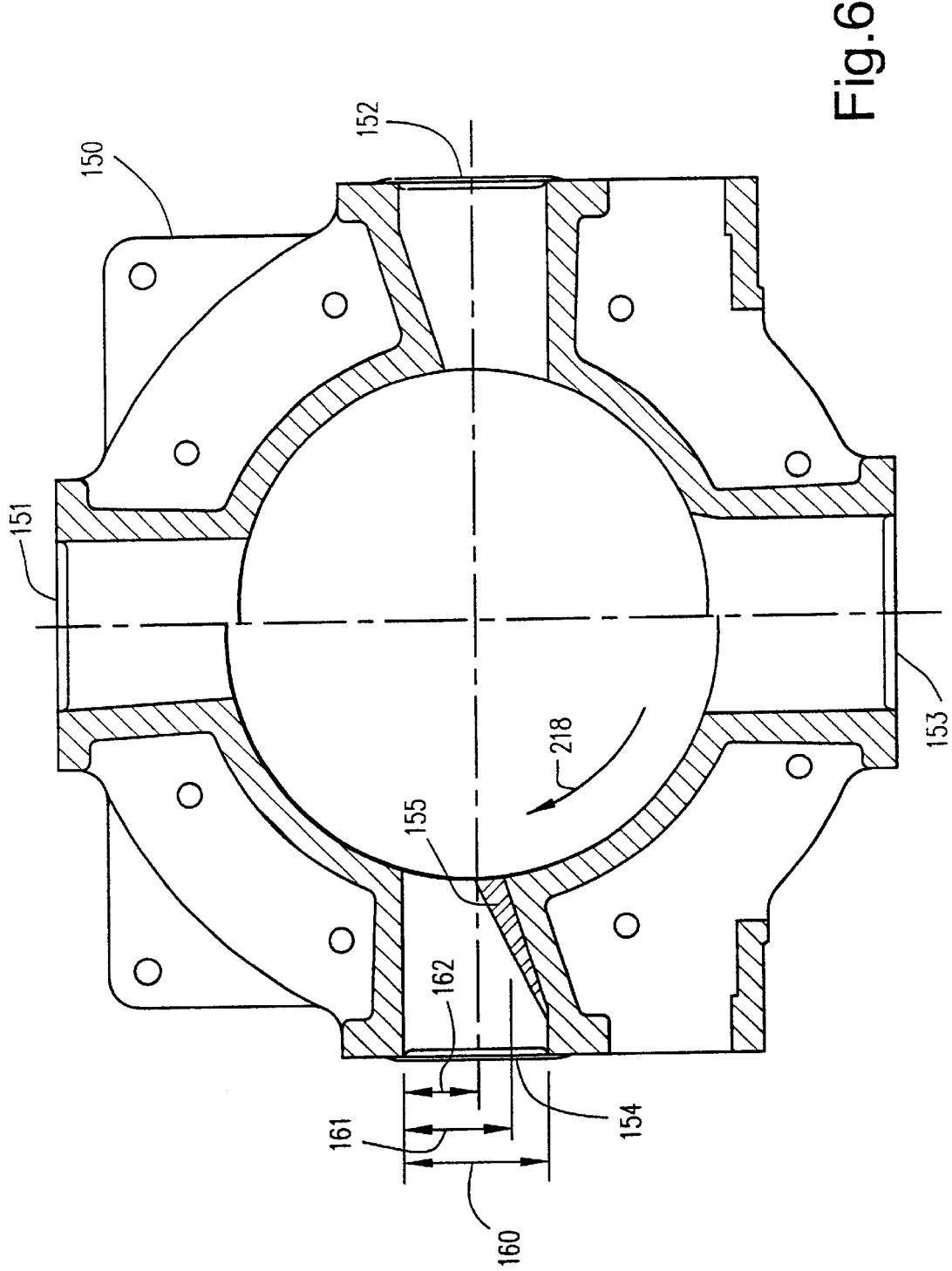
FIG. 6 is a view like FIG. 5 illustrating one aspect of the present invention.

FIG. 6 illustrates one embodiment of the present invention. In FIG. 6, the HPF housing 150 includes a low-pressure inlet port 151, a low-pressure outlet port 153, a high-pressure inlet port 154, and a high-pressure outlet port 152. The rotor (not shown) rotates in housing 150 in the direction of arrow 218. According to the present invention, the high pressure inlet port 154 is further modified compared to the prior art by introducing a further restriction 155 in the high-pressure inlet port 154. This restriction 155 reduces the open area of port 154 from its largest height 160 to a height of 162, that is, to a height even smaller than the height of the prior art pre-pressurization wedge 161, so that the cross-sectional area at 162 is at least 40% (preferably at least 50%) less than at 160.

Figure 7:
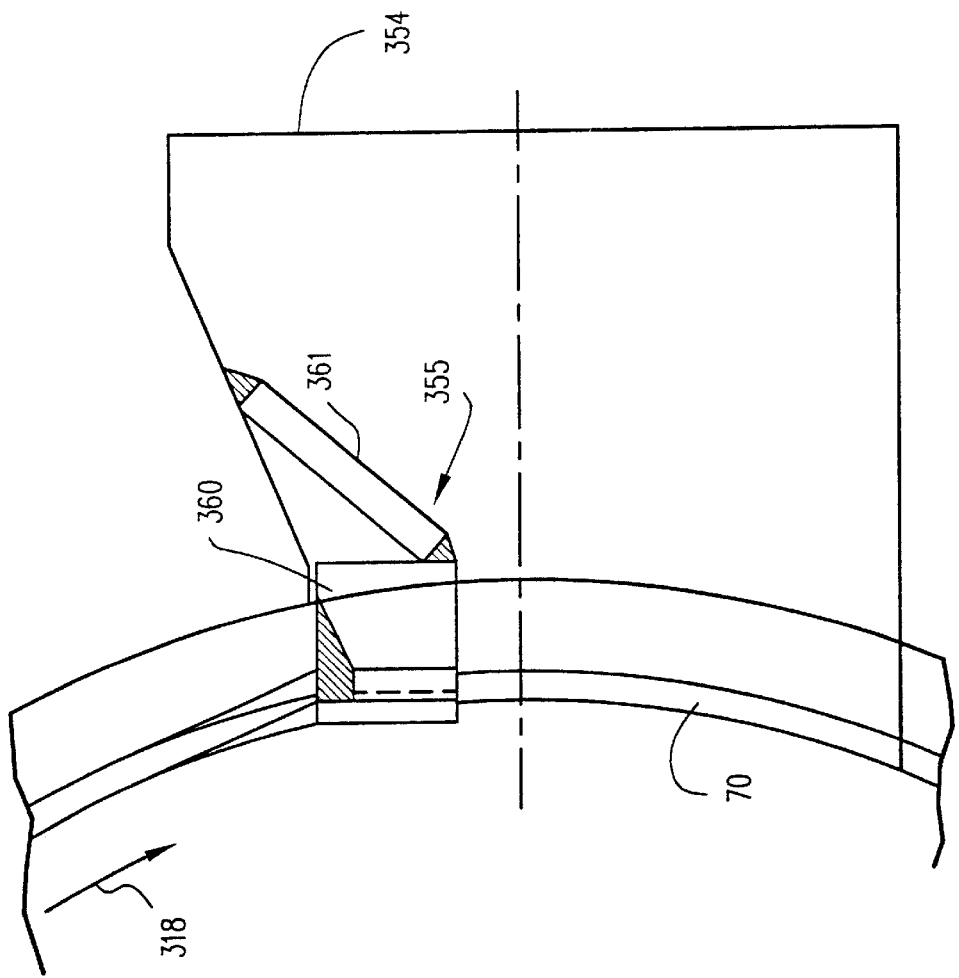
FIGS. 7 and 8 are detail views illustrating two embodiments of the invention shown in FIG. 6 as implemented in an existing prior art HPF.
Figure 8:
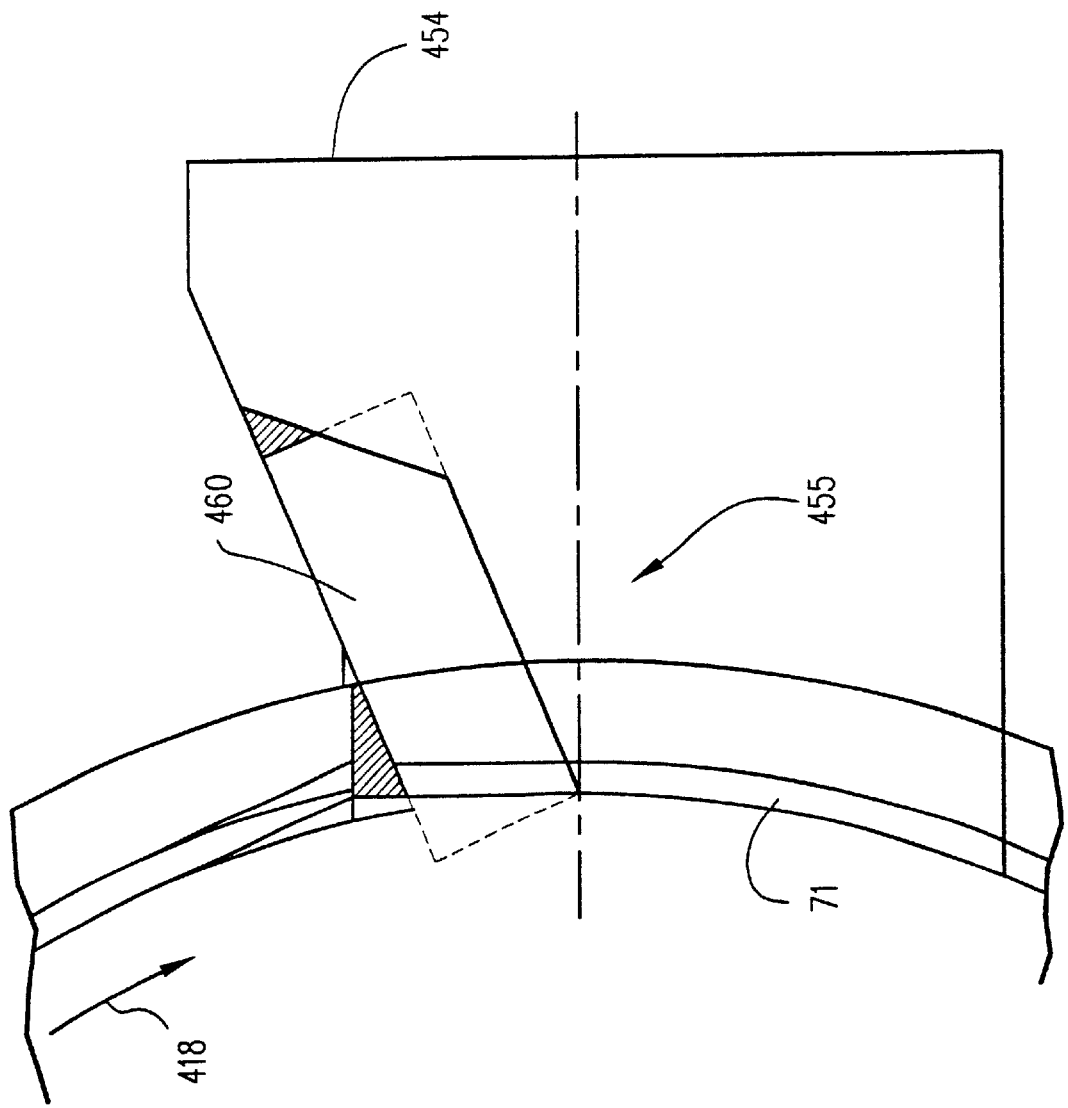

FIGS. 7 and 8 illustrate two methods of modifying an existing high-pressure inlet port (that is, retrofitting an existing HPF) to effect the desired invention. In FIG. 7, high-pressure inlet 354 of a HPF, having a rotor rotating in the direction of arrow 318 and a wear-resistant liner 70 (14' in FIG. 4), is modified by introducing a welded structure 355 to the inlet 354. In this embodiment, the welded structure 355 consists or comprises a block 360 and a plate 361 welded to inlet 354. After welding the structure 355 into the inlet, the structure 355 is machined so that the inside diameter of structure 355 substantially conforms to the inside diameter of liner 70.

Similarly, FIG. 8 illustrates a HPF having a high-pressure inlet 454, a rotor rotating in the direction of arrow 418 and a wear-resistant liner 71. The inlet 454 is modified by introducing a welded structure 455 to the inlet. In this embodiment, the welded structure 455 consists of or comprises a block 460 welded to inlet 454. After welding the structure 455 into the inlet, the structure 455 is machined so that the inside diameter of structure 455 substantially conforms to the inside diameter of liner 71.

FIGS. 9–12 illustrate another embodiment of the present invention in which the through-extending pockets of the HPF are modified to minimize or eliminate the restricted flow areas so that the slurry of material can more readily pass through the pocket. In FIGS. 9–12 components comparable to those in FIGS. 1–4 are shown by the same reference numeral preceded by a "1".

Figure 9:
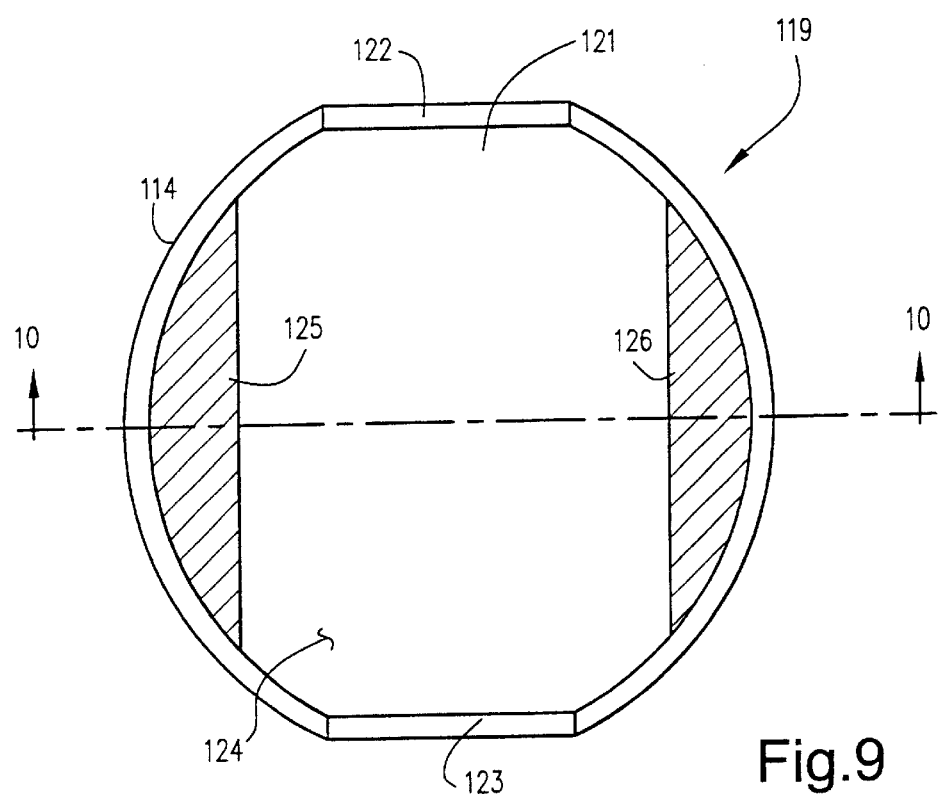
FIG. 9 schematically illustrates a cross section of an HPF rotor pocket according to one embodiment of the present invention.
Figure 10:
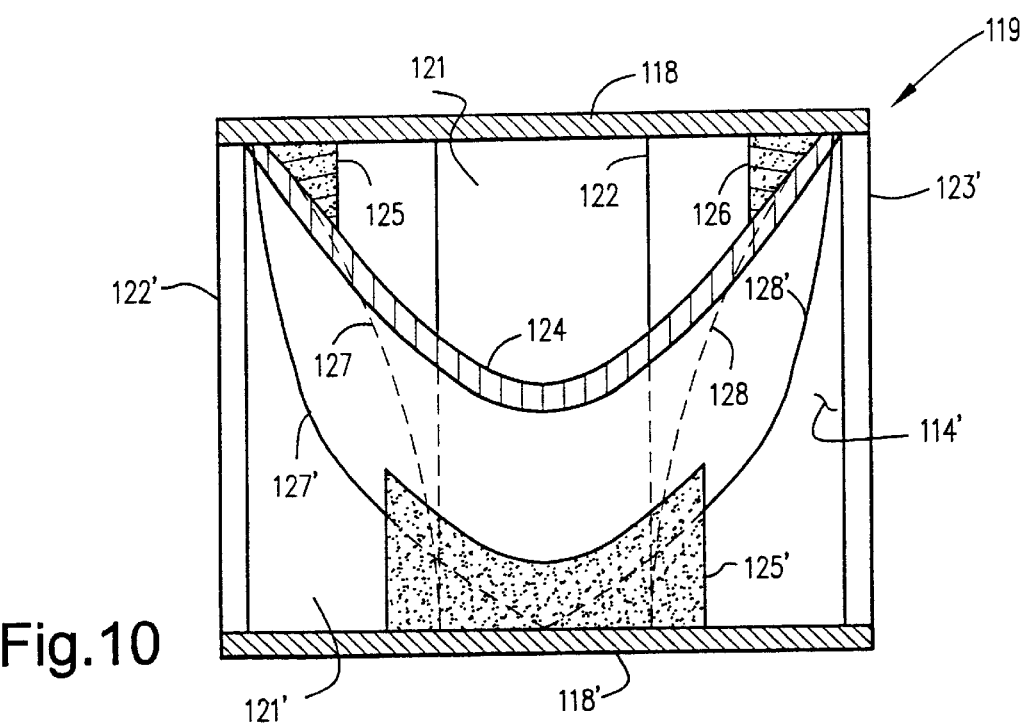
FIG. 10 is a sectional view taken along lines 10—10 of FIG. 9.

FIGS. 9 and 10 illustrate cross sectional views of the rotor 19 (see FIG. 4) modified according to one embodiment of the present invention. FIG. 9 is an end view taken, for example, from end 32 of rotor 19 (again, see FIG. 4)—in which the end plate (118 in FIG. 10) of the rotor has been removed for clarity of illustration of the rotor 119 interior. FIG. 10 is a cross sectional view taken through the section 10—10 of FIG. 9. In FIG. 10 only one-half of the rotor 119 is shown; an essentially identical section of the rotor is omitted for clarity. Rotor 119 includes an external shell 114; two end plates 118, 118'; and two through extending pockets 121, 121', having respective inlets 122, 122' and outlets 123, 123'. (Of course the inlet or outlet function of these opening will vary depending upon the orientation of the rotor 119 within the housing 14.) As is typical, the inlet 122 and outlet 123 of pocket 121 are positioned at essentially 90 degrees from inlet 122' and outlet 123' of pocket 121'. As is also conventional, the pockets 121, 121' are separated by a membrane or septum 124 which is shown clearly in cross section in FIG. 10. FIG. 10 also illustrates how the membrane interfaces with the internal shell wall 114' by lines 127, 128 (shown in phantom) and lines 127', 128'. According to one embodiment of the present invention, the narrow, restricted flow areas of the pockets are filled by inserts 125, 126, 125', 126' (not shown) to streamline the flow path through the pockets 121, 121'. The inserts 125, etc., fill up the nooks, crannies, and related flow restrictions, so that the pocket is substantially devoid of them. This streamlining of the pockets 121, 121' minimizes the restriction in flow and promotes more uniform and complete discharge of the rotor pocket when filled, as shown in FIG. 1, and emptied, as shown in FIG. 2. The inserts 125, etc., may be solid, or have a solid exterior and hollow interior.

Figure 11:
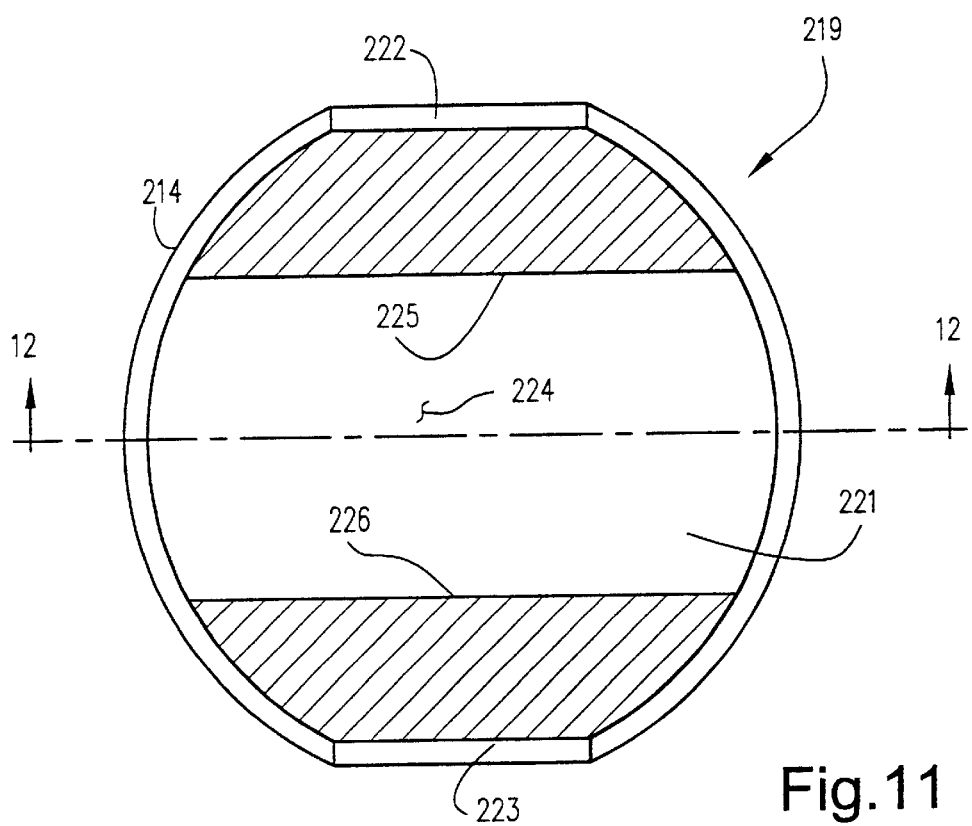
FIG. 11 is a view like FIG. 9 for another embodiment of the present invention.
Figure 12:
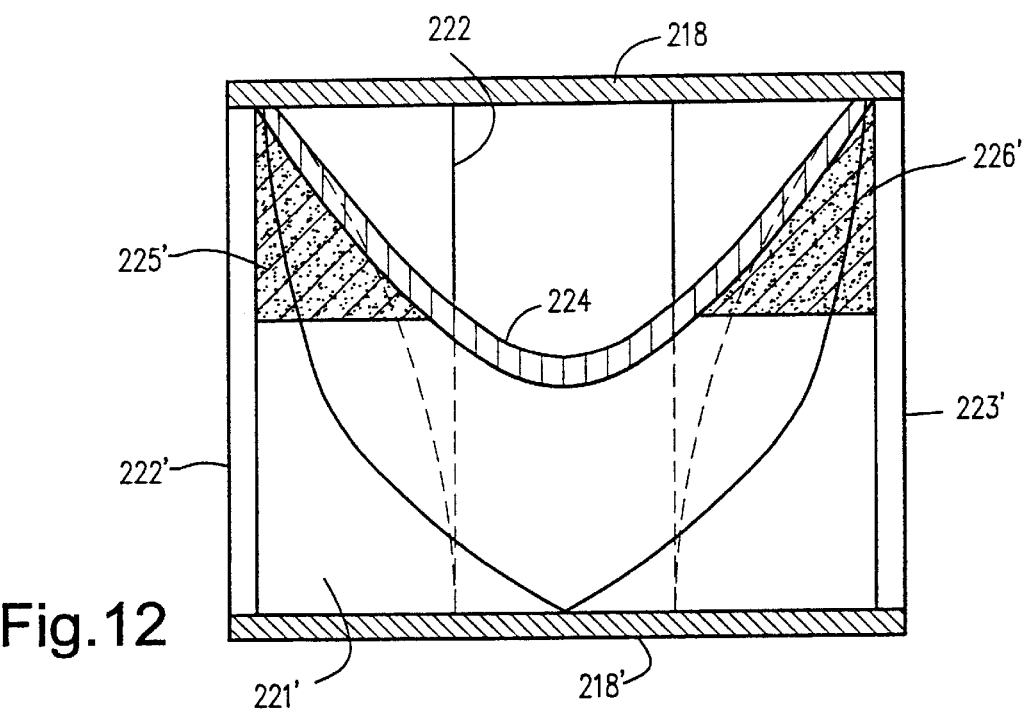
FIG. 12 is a sectional view like FIG. 10 taken along lines 12—12 of FIG. 11.

FIGS. 11 and 12 are also cross sectional views of a rotor 219 similar to the rotor 119 of FIGS. 9 and 10. In FIGS. 11 and 12 components comparable to those of FIGS. 1–4 are shown by the same reference numeral only preceded by a "2". FIG. 12 is a section of FIG. 11 taken along lines 12—12. As in FIGS. 9 and 10, FIGS. 11 and 12 show a rotor 219 having a shell 214; end plates 218, 218'; pockets 221, 221' having inlets 222, 222' and outlets 223, 223'; and a membrane 224. According to the present invention, FIGS. 11 and 12 also illustrate how the flow paths of a conventional rotor pockets can be modified by filling the pocket cavities as shown by inserts 225, 226, 225', and 226'. The flow path modifications shown in FIGS. 9 through 12 may be used alone or in combination. For example, when the flow paths are modified as shown in FIGS. 9 and 10 and as shown in FIGS. 11 and 12, the least obstructed flow path having the fewest recesses can be obtained.

When the modifications shown in FIGS. 9–12 are made, the areas where flow restrictions may hinder the flow of material through the pocket are minimized or eliminated, being filled by the inserts 125, 225, etc. These modifications may be made to newly fabricated rotors or may be made to existing rotors For example, the modifications shown in FIGS. 9–12 may be made by applying weld overlay to the existing structures or by fastening (for example, by welding, bolting, or other conventional fastening mechanisms) structures, such as steel plate, to the pocket of a new or existing rotor to conform to the desired shape. If available or feasible, an epoxy, resin, cement, or other similar initially fluid but hardenable wear resistant material. The material may be applied to the internal surfaces of the pocket to form the desired pocket geometry. Whatever structure or material is attached to the pocket, some final machining may be required to conform the geometry of the pocket to the desired shape. Also, according to this invention, the structures shown in FIGS. 9–12 which fill the recesses may assume other geometries and are not strictly limited to the geometries of the structures shown. These structures may assume whatever shapes, hollow, solid, or partially hollow, necessary in order to provide the desired effect: the minimization or elimination of restrictions to flow through the HPF pocket.

Figure 13:
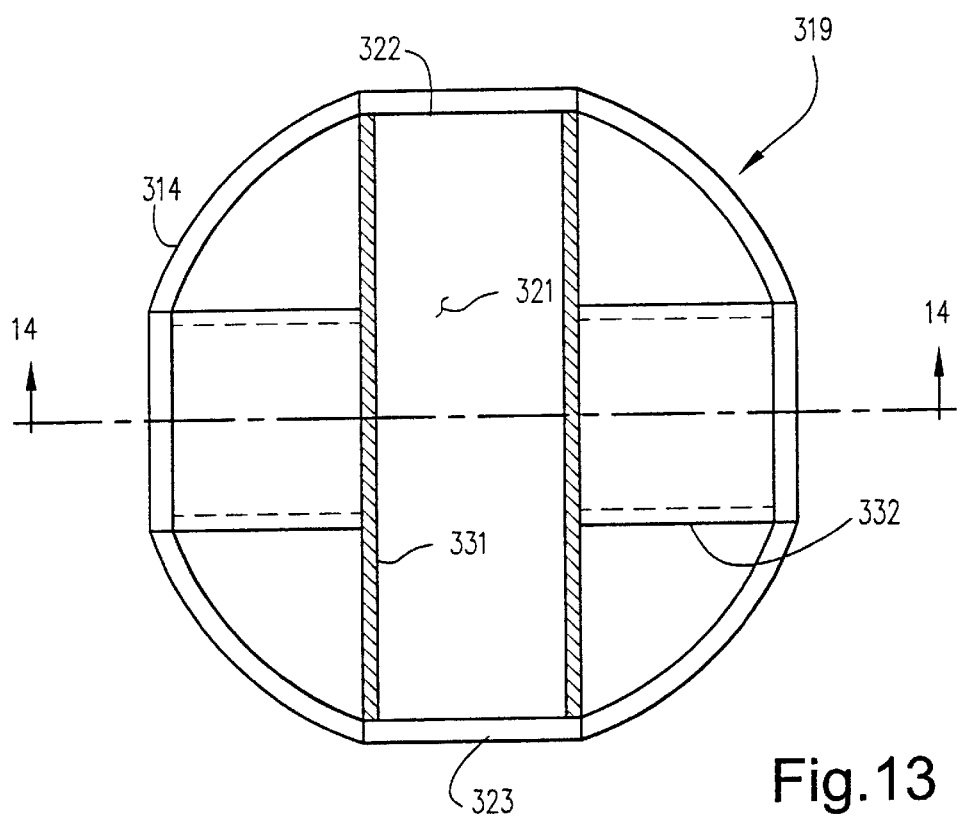
FIGS. 13 and 14 schematically illustrate a further embodiment of the present invention.
Figure 14:
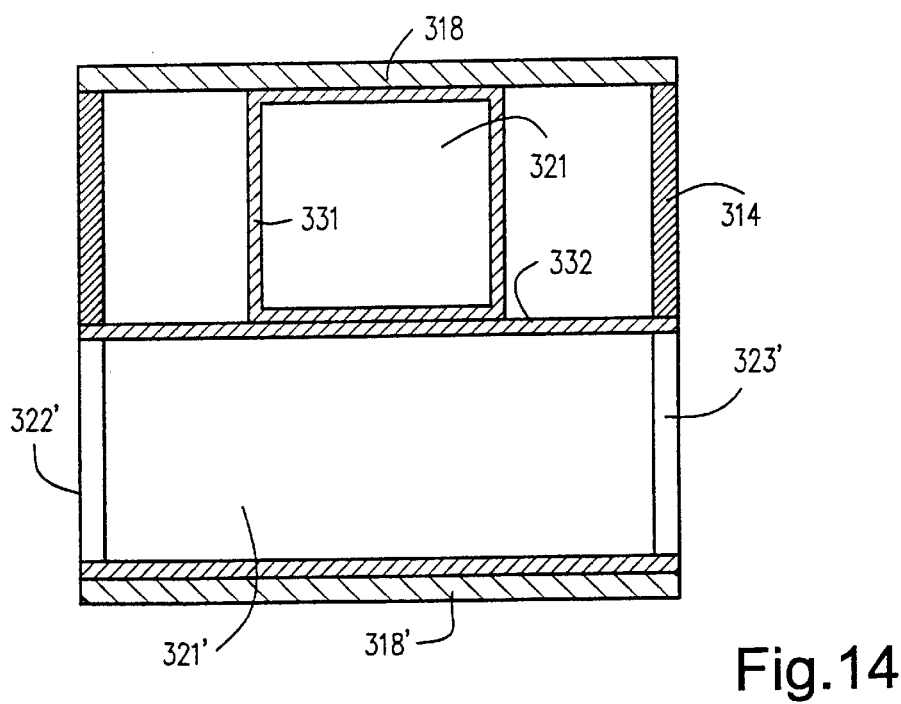

When all the modifications shown in FIGS. 9 through 12 are incorporated into existing rotor pockets, the cross section of the pocket approaches a uniform cross section having no recesses where material can accumulate and hinder flow. FIGS. 13 and 14 illustrate an extension of this concept in which the modified recesses of an existing rotor are replaced by conduits having a substantially uniform cross section. In FIGS. 13 and 14 components comparable to those in FIGS. 1–4 are shown by the same reference numerals only preceded by a "3". Similar to FIGS. 9 through 12, FIGS. 13 and 14 illustrate a rotor 319 having a shell 314; end plates 318, 318' and pockets 321, 321' having inlets 322, 322' and outlets 323, 323'. However, unlike the earlier embodiments, pockets 321, 321' are defined by conduits 331 and 332 that are essentially uniform in cross section. Though the conduits 331 and 332 shown are rectangular in cross section, these conduits may assume any appropriate cross section desired, including round or circular, elliptical, square, triangular, or another polygon, though it is desirable to minimize the number of sharp corners or recesses where material may accumulate. For example, the corners of conduits 321, 321' shown in FIGS. 13 and 14 may be rounded, beveled, or chamfered, or to include plates welded across the corners to minimize potential recesses.

The HPF 319 shown in FIGS. 13 and 14 may be fabricated from plate and conduit, for example, by welding, or the desired geometry may be effected by casting or forging, whatever is most economical. One method of providing this geometry is by using commercially available (preferably metal, such as steel) pipe or tubing or other conduit. If necessary, the structural integrity of the pocket can be strengthened by introducing intermediate supports internally or externally to the conduits shown in FIGS. 13 and 14. Any such support can be formed or machined or coated (e.g. with a solid lubricant such as polytetrafluoroethylene) to be substantially smooth and to provide as little restriction to the flow of slurry into and through the pocket as possible. FIGS. 13 and 14 show two tubes 331, 332 mounted in a substantially cruciform position.

Figure 15:
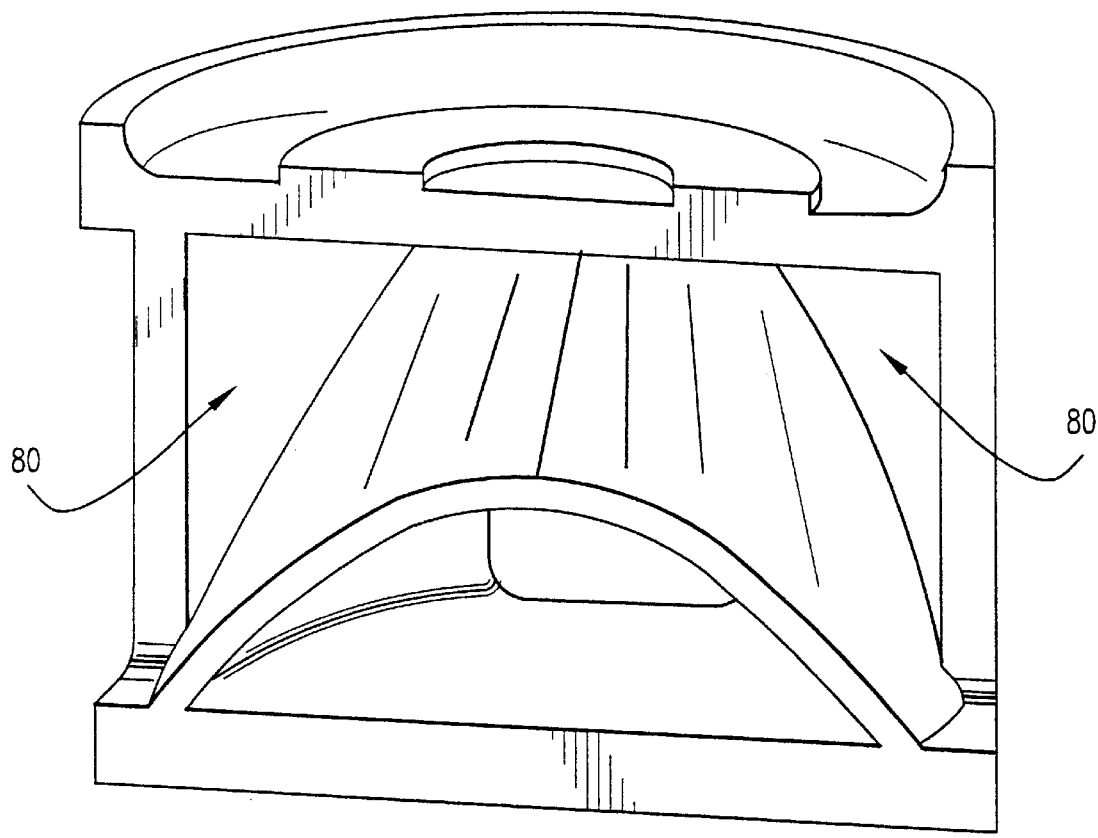
FIG. 15 is a schematic perspective computer generated view of one-quarter of an HPF rotor.

FIG. 15 is an isometric view of a cross section of the geometry of an existing HPF rotor pocket. According to one embodiment of this invention, this exiting rotor pocket is modified as shown in FIGS. 9–12 to minimize restrictions to flow through the pocket, by substantially filling the nooks, crannies, and related flow restrictions, shown generally at 80.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A high pressure transfer device comprising:
  a pocketed rotor containing a plurality of through going pockets, said rotor rotatable about a given axis of rotation and said pockets having opposite end openings which function as both inlets and outlets depending upon an angular position of the rotor within the device, and said pockets are provided in at least first and second sets;
  a housing enclosing said rotor, said housing having an exterior periphery and first through fourth ports disposed around the exterior periphery thereof for registry with the inlets to and outlets from said through going pockets,
  for each set, said first port being opposite said third port and said second port opposite said fourth port;
  said rotor mounted in said housing for rotation with respect to said ports about said given axis of rotation; and
  said pockets having each forming an interior passage through the rotor and extending between the end openings, the passage for each pocket is substantially uniform in cross-sectional area, where the cross-sectional area is transverse to an axis of the passage extending between the opposite end openings.

2. A transfer device as recited in claim 1 wherein said first port comprises a high pressure inlet port and further comprising a high pressure inlet port configuration having an opening adjacent said rotor at least 40% less in cross-sectional area than the largest cross-sectional area of said high pressure inlet.

3. A transfer device comprising:
  a pocketed rotor containing a plurality of through going pockets, said rotor rotatable about a given axis of rotation and said pockets having opposite end openings which function as both inlets and outlets depending upon an angular position of the rotor within the device, and said pockets are provided in at least first and second sets;
  a housing enclosing said rotor, said housing having an exterior periphery and first through fourth ports disposed around the exterior periphery thereof for registry with the inlets to and outlets from said through going pockets,
  for each set, said first port being opposite said third port, and said second port opposite said fourth port;
  said rotor mounted in said housing for rotation with respect to said ports about said given axis of rotation; and
  said pockets each having an interior surface defining a passage, and each passage having a substantially uniform cross-sectional area along a passage axis extending between the opposite end openings.

4. A transfer device as recited in claim 3 wherein each said pocket is substantially polygonal, and substantially uniform in size, in cross-section over at last a majority of the length thereof.

5. A transfer device as recited in claim 3 wherein at least some of said pockets are mounted in a substantially cruciform position within said rotor.

6. A high pressure transfer device comprising:
  a pocketed rotor containing a plurality of through going pockets, said rotor rotatable about a given axis of rotation and said pockets having opposite end openings which function as both inlets and outlets depending upon an angular position of the rotor within the device, and said pockets are provided in at least first and second sets, with the pockets in each set offset from the pockets in the at least one other set;
  a housing enclosing said rotor, said housing having an exterior periphery and first through fourth ports disposed around the exterior periphery thereof for registry with the inlets to and outlets from said through going pockets, for each set; for each set said first port being opposite said third port; and said second port opposite said fourth port;

said rotor mounted in said housing for rotation with respect to said ports about said given axis of rotation; and said pockets defined by substantially smooth interior wall tubes, wherein said tubes have a cross sectional shape that is substantially devoid of abrupt changes through the pocket, and said cross-sectional shape has a substantially uniform area along an axis of the tube.

7. A rotary high pressure feeder for processing cellulosic fibrous material comprising:

a rotor rotatable about an axis and comprising a first pocket and a second pocket, said first pocket and second pocket each comprising a conduit extending through the rotor and having end openings at opposite ends of the pocket, wherein each of said conduits are substantially straight and uniform in cross-sectional area along an axis of the conduits extending between the end openings, and wherein each of said end openings of each pocket functions as both an inlet and outlet depending upon an angular position of the rotor within a housing;

the housing encloses said rotor and said housing comprises an exterior periphery and first through fourth ports disposed around the exterior periphery thereof for registry with the end openings of said first and second pockets, and said rotor mounted in said housing for rotation with respect to said ports about said axis, wherein said the end openings of first pocket align with the first and third ports when said end openings of the second pocket align with the second and fourth ports.

8. A rotary high pressure feeder as in claim 7 wherein said first through fourth ports comprise: a low-pressure inlet port as the first port and connectable to a supply of the cellulosic fibrous material; a low-pressure outlet port as the third port and opposite the low-pressure inlet port, wherein said low-pressure outlet port is connectable to a screen element; a high-pressure inlet port as the fourth port and connectable with a high pressure hydraulic pump, and a high-pressure outlet port as the second port and opposite the high pressure inlet port, wherein the high-pressure outlet port is connectable to a digester.

9. A rotary high pressure feeder as in claim 8 wherein the low-pressure inlet port is on a top region of the exterior periphery of the housing; the low-pressure outlet port is on a bottom region of the exterior of the periphery of the housing, and the high-pressure inlet and outlet ports are on opposite sides of the periphery of the housing.

10. A rotary high pressure feeder as in claim 8 wherein said rotor rotates through the first through fourth ports sequentially, and wherein at a certain angular position of said rotor one of the end openings of said first pocket is registered with the first port and an opposite end opening of the first pocket is registered with the third pocket, and one of the end openings of said second pocket is registered with the fourth port and an opposite end opening of the second pocket is registered with the second port.

11. A rotary high pressure feeder as in claim 7 wherein the first and second pockets are pipes or tubes arranged in the rotor.

12. A rotary high pressure feeder as in claim 7 wherein the first and second pockets are orthogonal.

13. A rotary high pressure feeder as in claim 7 wherein the first and second pockets have a uniform cross-section through a length of each pocket.

14. A rotary high pressure feeder as in claim 7 wherein the first and second pockets comprise a uniform rectangular cross-section through a length of each pocket.

15. A rotary high pressure feeder as in claim 7 wherein the first and second pockets each comprise an inner conduit surface having a smooth coating of a solid lubricant.

16. A rotary high pressure feeder as in claim 7 wherein the first and second pockets each comprise an inner conduit surface having a smooth coating of polytetrafluoroethylene.

17. A rotary high pressure feeder as in claim 7 wherein the first and second pockets are arranged in a cruciform in the rotor.

* * * * *